Nov. 10, 1970     K. M. GEBEL     3,538,560
CLAMP
Filed March 25, 1969
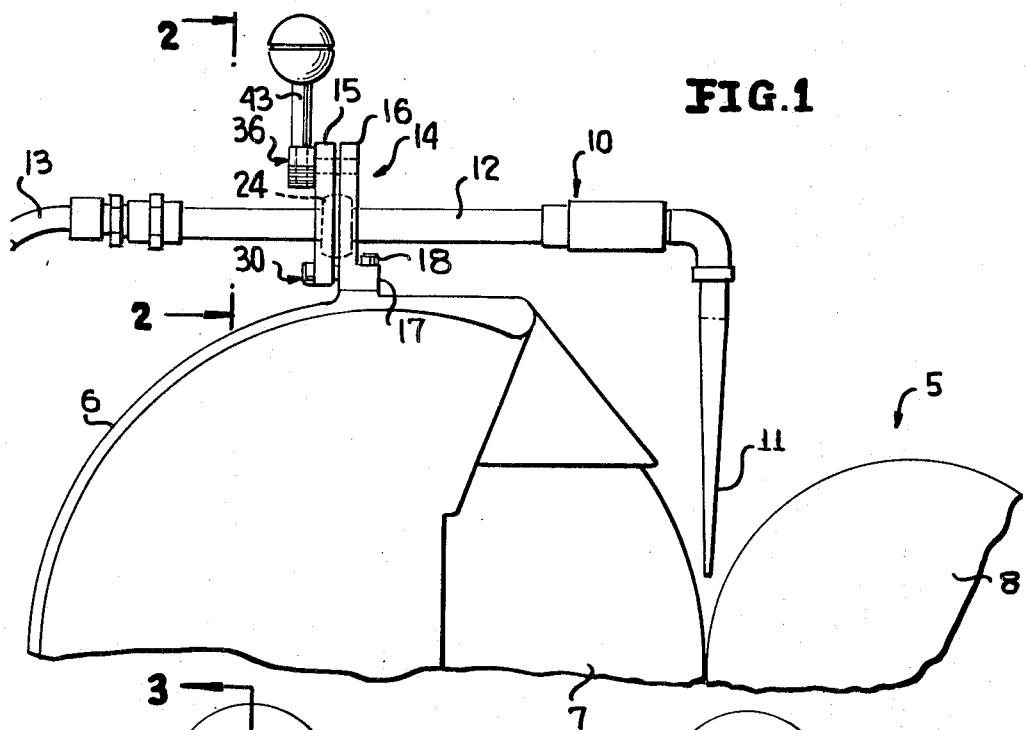
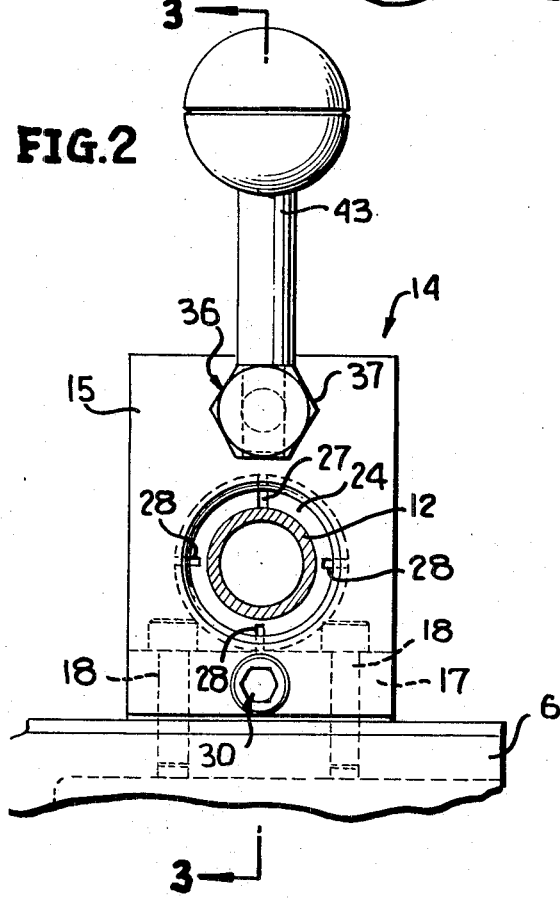
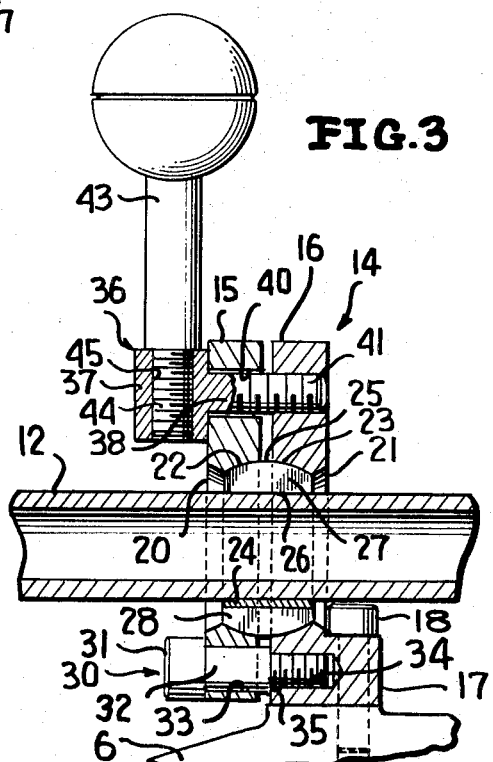
INVENTOR
KURT M. GEBEL
BY *Diller, Brown, Ramik & Holt*
ATTORNEYS

United States Patent Office 3,538,560
Patented Nov. 10, 1970

3,538,560
CLAMP
Kurt M. Gebel, Waynesboro, Pa., assignor to Litton Industries, Inc., Beverly Hills, Calif., a corporation of Delaware
Filed Mar. 25, 1969, Ser. No. 810,140
Int. Cl. A44b 21/00
U.S. Cl. 24—263     8 Claims

ABSTRACT OF THE DISCLOSURE

This disclosure has to do with a clamp for adjustably mounting a pipe with the clamp featuring a quick releasing and positioning mechanism so as to facilitate the adjustment of the pipe. The clamp is particularly adapted for clamping a fluid supply pipe of a machine tool, particularly a coolant pipe for directing coolants and lubricants onto workpieces.

---

This invention relates in general to new and useful improvements in clamps, and more particularly to a quick release coolant pipe positioner for machine tools.

Many machine tools are provided with coolant pipes for directing coolants and lubricants to various components thereof, and more particularly to the surface portion of a workpiece which is being machined therein. For numerous apparent reasons, it is desirable to adjustably position the coolant pipe. Furthermore, during certain operating conditions of the machine and for purposes of repairs, it is necessary that the coolant pipe be moved to an out of the way position. In the past, while such coolant pipes have been adjustably mounted and have been movable to out of the way positions, relatively complicated clamp mechanisms have been involved. The customary clamp mechanism has four fasteners which must be released in order to provide the necessary adjustment. It will be readily apparent that this is time consuming and, therefore, undesirable.

In accordance with this invention, it is proposed to provide a simple clamp for quickly releaseably and adjustably positioning a pipe, the clamp having a single actuator for moving it between a pipe clamping position and a pipe releasing position.

The clamp formed in accordance with this invention includes a pair of clamp plates having mounted therein a part spherical bushing with the bushing being split so as to be compressible about a pipe. The clamp plates are secured together by two fasteners, one of which is normally fixed and serves to space apart the clamp plates at one side of the bushing a distance sufficient to generally retain the bushing in a clamped relation therebetween while permitting a pipe passing through the bushing to be readily adjusted, and a second fastener disposed remote from the first fastener, the second fastener being quickly movable between a bushing clamping position and a bushing releasing position.

With the above and other objects in view that will hereinafter appear, the nature of the invention will be more clearly understood by reference to the following detailed description, the appended claims and the several views illustrated in the accompanying drawings:

In the drawings:

FIG. 1 is a fragmentary elevational view of a grinder showing the clamp positioning a coolant pipe to direct coolant onto a workpiece at the point of engagement thereof with the grinding wheel.

FIG. 2 is an enlarged fragmentary sectional view taken along the line 2—2 of FIG. 1 and shows specifically the details of the clamp.

FIG. 3 is an enlarged fragmentary sectional view taken along the line 3—3 of FIG. 2 and shows further the details of the clamp.

Referring now to the drawing, reference is first made to FIG. 1 wherein there is illustrated a typical machine tool, the illustrated machine tool being a grinder, generally referred to by the numeral 5. The illustrated components of the grinder 5 include a housing 6, a grinding wheel 7 and a workpiece 8 which is being ground by the grinding wheel 7.

The grinder 5 also includes a coolant pipe assembly which is identified by the numeral 10 and includes a nozzle 11 which is carried by a pipe 12. The pipe 12 has a supply line 13 connected thereto, which supply line is preferably flexible so as to facilitate adjustment of the position of the nozzle 11. The coolant pipe assembly 10 is adjustably and releasably positioned on the grinder 5 by means of a clamp which is generally identified by the numeral 14 and which is the subject of this invention. The clamp 14 is mounted on the housing 6.

Referring now to FIGS. 2 and 3 in particular, it will be seen that the clamp 14 includes a pair of clamp members or plates 15 and 16 which are disposed in opposed parallel relation. The clamp plate 16 is provided at the lower end thereof with a mounting flange 17 and is releasably secured to the housing 6 by a pair of fasteners 18 extending through the mounting flange 17 and threadedly engaged into the housing 6.

The clamp plates 15 and 16 have aligned openings 20 and 21 through which a pipe, such as the pipe 12, may freely pass. The clamp plates 15 and 16 also have generally opposed part spherical clamping surfaces 22 and 23 surrounding the openings 20 and 21, respectively.

A split bushing 24 is mounted within and between the clamp plates 15 and 16. The bushing 24 has a part spherical outer surface 25 which mates with the clamping surfaces 22 and 23. The bushing 24 is also provided with a bore 26 of a diameter to freely receive the pipe 12 in the unclamped position of the bushing 24.

With particular reference to FIG. 2, it will be seen that the bushing 24 is split radially completely between its inner and outer surfaces as at 27. In addition, at the quarter points thereof, it is longitudinally externally grooved as at 28. Thus, the bushing 24 is extremely flexible and may be readily compressed so as to readily clamp the pipe 12 therein.

It will be apparent from FIG. 3 that the clamp plates 15, 16 are maintained in their assembled relation with the bushing 24 trapped therebetween by means of a first fastener 30 in the form of a shoulder bolt. The bolt 30 includes a head 31 which abuts against the outer surface of the clamp plate 15, a shank 32 which passes through a bore 33 in the lower part of the clamp plate 15, and a reduced diameter externally threaded end 34 which is fully threaded within the lower part of the clamp plate 16. In addition, the shoulder bolt 30 includes a shoulder 35 at the intersection of the shank 32 and threaded end portions 34, which shoulder 35 abuts against the inner face of the clamp plate 16 so as to maintain the lower portion of the clamp plates 15 and 16 in predetermined spaced relation.

The clamp plates 15 and 16 are also secured together by a second fastener in the form of a quick acting bolt which is generally identified by the numeral 36. The bolt 36 includes an enlarged head 37 which abuts against the outer surface of the clamp plate 15 and which has a shank 38 which freely passes through a bore 40 in the upper portion of the clamp plate 15. The end portion of the shank 38 is provided with quick acting threads 41 and is threaded into the upper portion of the clamp plate 16.

In accordance with this invention, when the bolt 30 is fully tightened into position, and the bolt 36 is in a loose position, the bushing 24 is trapped between the clamp plates 15 and 16, but is readily adjustable therein so that it may be rocked within the clamp plates. In addition, the bushing 24 is in a relaxed condition wherein the pipe 12 is freely slidable and turnable within the bore 26 of the bushing 24. Thus, the pipe 12 may be longitudinally slid through the clamp 14, may be rotated about its axis within the clamp 14 or may be rocked in a limited universal manner relative to the clamp 14 so as to either facilitate the accurate positioning of the nozzle 11, or the removal of the nozzle 11 to an out of the way position. On the other hand, because of the quick acting threads 41, when the bolt 36 is rotated through an angle of less than 180 degrees, the clamp plates 15 and 16 are brought together so as to not only tightly clamp the bushing 24 therebetween to position the bushing therein, but also to tightly clamp the bushing 24 around the pipe 12 so as to axially and rotationally fix the pipe 12 within the bushing 24.

In order to facilitate the movement of the bolt 36 between the bushing releasing position and the bushing clamping position, the head 37 of the bolt 36 is provided with a lever 43. The lever 43 includes a threaded shank portion 44 which is threaded into an internally threaded bore 45 through the head 37, as is best shown in FIG. 3. Thus, the operator of the machine tool need only move the lever 43 to accomplish the releasing and/or clamping of the pipe 12.

Although only a preferred embodiment of the clamp has been specifically illustrated and described herein, it is to be understood that minor variations may be made therein without departing from the spirit of the invention.

What is claimed as new:

1. For use in a machine tool, a quick release coolant pipe positioner comprising a pair of clamp members, one of said clamp members having mounting means for fixedly positioning one of said clamp members, said clamp members having aligned pipe receiving openings therethrough and opposed clamping surfaces, a pipe clamping member positioned between said clamping surfaces, first fastening means securing together said clamp members in positions retaining said clamping member therebetween in a pipe releasing position, and single second fastening means for quickly moving said clamp members between clamping and released positions.

2. The positioner of claim 1 wherein said clamping member is in the form of a split bushing.

3. The positioner of claim 1 wherein said clamping member is in the form of a split bushing, and said bushing having surfaces mating with said clamping surfaces.

4. The positioner of claim 1 wherein said clamping member is in the form of a split bushing, and said bushing having surfaces mating with said clamping surfaces, said surfaces having axial and transverse components whereby axial movement of said clamp members results in transverse clamping and releasing movement of said clamping member.

5. The positioner of claim 1 wherein said clamping member is in the form of a split bushing, and said bushing having surfaces mating with said clamping surfaces, said surfaces being part spherical whereby said bushing is self-aligning in said clamp members.

6. The positioner of claim 1 wherein said first fastening means is in the form of a shoulder bolt freely passing through one clamp member and fully threaded into the other clamp member.

7. The positioner of claim 1 wherein said first fastening means is in the form of a shoulder bolt freely passing through one clamp member and fully threaded into the other clamp member, and said second fastening means being in the form of a second bolt freely passing through one clamp member and adjustably threaded into the other clamp member.

8. The positioner of claim 1 wherein said first fastening means is in the form of a shoulder bolt freely passing through one clamp member and fully threaded into the other clamp member, and said second fastening means being in the form of a second bolt freely passing through one clamp member and adjustably threaded into the other clamp member, said second bolt having a quick action actuator.

References Cited

UNITED STATES PATENTS

| 2,705,642 | 4/1955 | Chasar | 24—263 X |
| 2,962,079 | 11/1960 | Wilson | 24—263 X |
| 3,043,587 | 7/1962 | Underhill | 269—71 |

LEONARD D. CHRISTIAN, Primary Examiner

U.S. Cl. X.R.

269—174